United States Patent [19]

Steel

[11] Patent Number: 4,655,340
[45] Date of Patent: Apr. 7, 1987

[54] ANGLE STATIONS IN OR FOR ENDLESS CONVEYOR BELTS

[75] Inventor: Alan Steel, Glasgow, Scotland

[73] Assignee: Anderson Strathclyde PLC, Glasgow, Scotland

[21] Appl. No.: 548,627

[22] Filed: Nov. 4, 1983

[30] Foreign Application Priority Data

Nov. 10, 1982 [GB] United Kingdom ............... 8232119

[51] Int. Cl.$^4$ ............................................. B65G 15/60
[52] U.S. Cl. ................................... 198/839; 198/841
[58] Field of Search ............... 198/839, 785, 806, 841

[56] References Cited

U.S. PATENT DOCUMENTS

| | | |
|---|---|---|
| 2,222,019 | 11/1940 | Buchanan . |
| 2,369,479 | 2/1945 | Michna ................................ 198/839 |
| 2,561,708 | 7/1951 | Milik .................................... 198/839 |
| 2,798,590 | 7/1957 | Raskin ................................. 198/839 |
| 2,828,852 | 4/1958 | Lorig ................................... 198/785 |
| 2,861,675 | 11/1958 | Cordis ................................. 198/839 |
| 3,016,127 | 1/1962 | Cooper ................................ 198/839 |
| 3,184,043 | 5/1965 | Gibbon . |
| 3,189,166 | 6/1965 | Ziller ................................... 198/839 |
| 3,203,536 | 8/1965 | Shaw ................................... 198/839 |
| 3,319,767 | 5/1967 | Breternitz et al. .................. 198/841 |
| 3,661,246 | 5/1972 | Faunce et al. ...................... 198/806 |

FOREIGN PATENT DOCUMENTS

| | | |
|---|---|---|
| 867517 | 1/1953 | Fed. Rep. of Germany ...... 198/839 |
| 932415 | 8/1955 | Fed. Rep. of Germany ...... 198/839 |
| 1038477 | 9/1958 | Fed. Rep. of Germany ...... 198/806 |
| 2948290 | 6/1981 | Fed. Rep. of Germany ...... 198/839 |
| 433756 | 8/1935 | United Kingdom ............... 198/839 |
| 709019 | 5/1954 | United Kingdom . |
| 919544 | 2/1963 | United Kingdom . |
| 1048256 | 11/1966 | United Kingdom ............... 198/839 |

Primary Examiner—Joseph E. Valenza
Attorney, Agent, or Firm—Saidman, Sterne, Kessler & Goldstein

[57] ABSTRACT

In an angle station for an endless conveyor belt, there are presented to each incoming run of the belt stationary curved guide members (18, 19) of the shape of a major segment of a right-circular cylinder and having in the part-cylindrical portion (16 or 17) thereof rectangular openings (15) arranged in parallel and helical paths and through which project small freely-rotatable rollers (14), the continuously-changing segments of the curved surfaces of which projecting through said openings (15) are in attitude to change the direction of travel of the belt (13) through 90° during passage of the belt about the part-cylindrical portion (16 or 17) of the guide member (18 or 19).

The rectangular openings (15) are arranged with their longer edges lengthwise of the diagonals representing the mean of the helix but with those of a plurality of the rows nearest to each end of the part-cylindrical portion (16 or 17) slightly out of axial symmetry with said diagonals, being slightly inclined in a direction about the intersections (40) of the diagonals of the main portion of the openings, to provide a "toe-in" attitude in relation to the line of run of the endless conveyor belt.

11 Claims, 22 Drawing Figures

ANGLE STATIONS IN OR FOR ENDLESS CONVEYOR BELTS

The Government of the United States of America has rights in this invention pursuant to contract No. DE-AC-01-81FE14181 awarded by the U.S. Department of Energy.

This invention relates to angle stations in or for endless conveyor belts.

There are many situations where an endless conveyor belt for transporting materials, such as coal, has to undergo a change of direction through 90° at a station, known as an angle station, situated intermediate the length of the conveyor belt between the loading and discharge ends of the conveyor belt.

U.S. Pat. No. 2,222,019 discloses an angle station, comprising co-axial scroll guides each consisting of a support bent into foursided form and having four plane faces successively at included angles of 120° to one another whereby the upper and lower faces are parallel to one another. A series of short cambered rollers are mounted on this support so that they define a helical path, one row of similarly oriented rollers being provided on each of the four faces and the rollers being carried by forked bearings mounted on the faces, the outward run of an endless conveyor belt passing in scroll fashion over and under the outside guide and the return run passing in scroll fashion under and over the inner guide.

British Patent Specification No. 709,019 discloses an angle station comprising belt supporting and centering devices each consisting of a cylindrically or semicylindrically shaped supporting beam with two kinds of rotating idler rollers arranged to be outstanding from a flexible mesh bent over the beam to form a curved guide for the belt. Such an angle station would be both difficult and expensive to construct, involving, as it does, a large number of short links which have to be machined and pivoted to one another and to the shafts on which the idler rollers rotate and large numbers of tension rollers and links which provide cross-ties of the mesh. Moreover, the construction would be insufficiently robust to withstand the rigours which would be encountered when operational especially since the rollers and their bearings would be fully exposed and subject to the deleterious influences of pieces of material tumbling from the belt and of airborne dust.

U.S. Pat. No. 3,184,043 discloses an angle station in which two curved plates are mounted in a framework, the curvatures of the plates being in part-spiral shape about axes one below and at essentially 90° to the other. The axis about which each plate is curved is at an angle to one of the sides of the plate such that said one of the sides and a side parallel to it before curvature are after curvature at approximately 90° to one another and are in parallel and vertically-spaced planes. Each plate has therein openings in spaced rows parallel to said one side with the openings in one row laterally offset from the openings in an adjacent row and each of the openings has a freely rotatable small roller projecting therethrough. The specification does not indicate that there is any importance in the number of small rollers on each of the curved plates nor in the relationship of these small rollers to each other and to the belt running over them. The first three rows of rollers shown in FIG. 1 of the drawings accompanying the specification do not contribute to changing the angle of the belt. Only those situated where the belt begins to effect its change of plane contribute to proper support of the belt.

An object of the present invention is to provide an angle station enabling the change in direction of the endless conveyor belt to be achieved smoothly with perfect alignment and without distortion of the conveyor belt across its width or undue stress thereon at its longitudinal edges or in the belt-joining means.

To achieve this object, the maximum number of rollers possible must be provided and each must be in a particular relationship one to the other both across the belt width and in the direction of run of the belt so that there will be no significant change in the stress pattern within the conveyor belt and its joints thus maintaining the essential reliability of the belt conveying principle.

In accordance with the present invention, there is provided an angle station for an endless conveyor belt wherein there are presented to each incoming run of the belt stationary curved guide members having therein openings through which project small freely-rotatable rollers, characterized in that each stationary guide member is of the shape of a major segment of a right-circular cylinder whereof, in modus operandi, the axis is in a plane below and parallel to the inner surface of the incoming belt run and extends diagonally of the spaced and parallel vertical planes containing the edges of the incoming belt run, the openings in the part-cylindrical portion of the guide members are rectangular with the intersections of the two diagonals of each interspaced both in parallel rows which extend longitudinally of the respective part-cylindrical portion and in parallel and helical paths the mean of each of which extends diagonally of the development of the part-cylindrical portion, and the continuously-changing segments of the curved surfaces of the freely-rotatable small rollers projecting through said openings are in attitude to change the direction of travel of the belt through 90° during passage of the belt about the part-cylindrical portion of the guide member.

An embodiment of the invention will now be described, by way of example, with reference to the accompanying drawings, in which.

FIGS. 15 to 18 are plan views illustrating attitudinal variations of the angle station to cater for different directions of belt entry thereinto and belt exit therefrom; and FIGS. 19 to 22 are elevational views showing roller arrangements respectively for incoming belt runs whether from the horizontal or from rising inclinations, for outgoing belt runs to the horizontal, for outgoing belt runs to dipping inclinations, and outgoing belt runs to rising inclinations.

Figure 1:
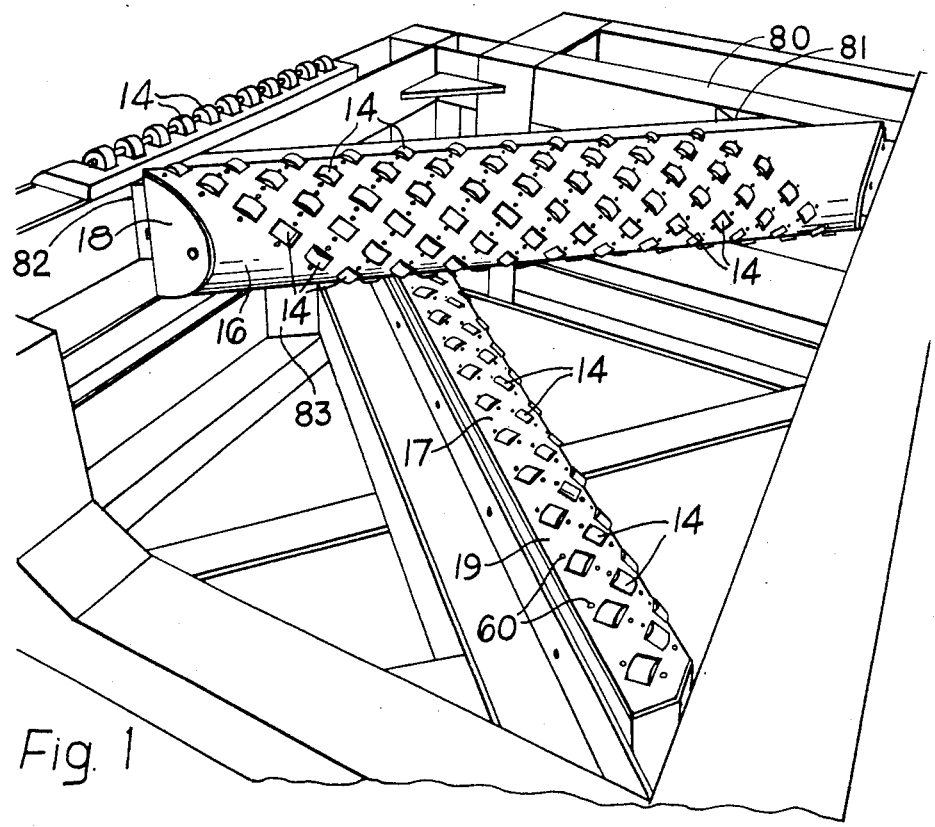
FIG. 1 is a perspective view from above illustrating the banks of small rollers mounted for free rotation in upper and lower stationary guide members at an angle station in accordance with the invention.
Figure 2:
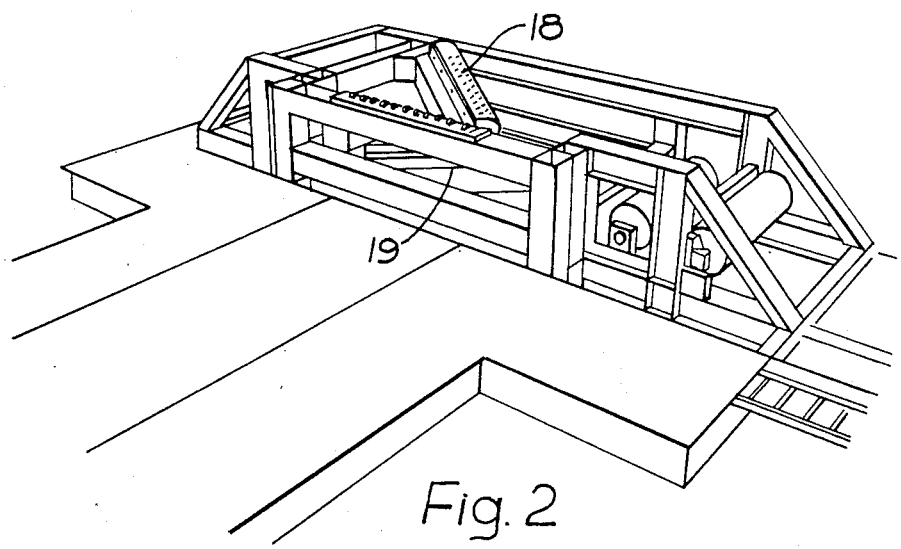
FIG. 2 is another perspective view from above of the angle station on a smaller scale and looking from somewhat to the right of the direction the upper run of an endless conveyor belt would approach for its undersurface to contact the small rollers mounted on the upper stationary guide.
Figure 15:
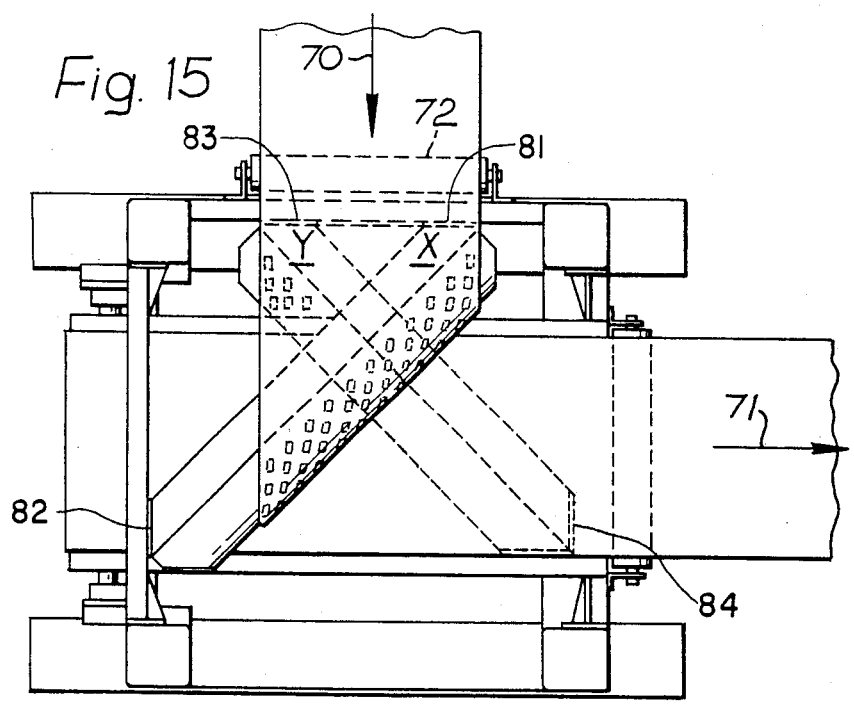

Referring now to FIGS. 1 to 14 of the drawings, throughout which like reference numerals denote like parts, the inner surfaces 9 and 10, respectively, of the upper and lower runs 11 and 12, respectively, of an endless conveyor belt 13 contact the continuously-changing segments of the curved surfaces of numerous small rollers 14 mounted for free rotation in rectangular openings 15 therefor in the part-cylindrical portions 16, 17, respectively, of upper and lower stationary guide members 18, 19, respectively. The guide members 18, 19 are mounted on a rectangular frame 80 which has first and second pairs of seatings 81, 82, and 83, 84, of which the seatings 81, 82 are on a level above that of the seatings 83, 84. Guide member 18 (X in FIGS. 15–18) is mounted on the first upper pair of seatings 81, 82 and guide member 19 (Y in FIGS. 15–18) is mounted on the second lower pair of seatings, so that the guide members 18, 19 are vertically spaced and disposed at 90° to each other, as shown in FIGS. 1 and 15. Third and fourth pairs of upper and lower seatings 85, 86 and 87, 88, respectively, are also provided for reasons described more fully hereinafter with reference to FIGS. 15–17.

Each guide member 18, 19 is of the shape of a major segment of a right-circular cylinder whereof the axis is in a plane below and parallel to the projected path of travel of the inner surface of the pertaining run 11 or 12 of the belt 13 and extends diagonally of the spaced and parallel vertical planes containing the edges 20, 21 of the respective belt runs 11 and 12. The attitudes of the small rollers of each of the two sets to the respective incoming belt run are such as to change through 90° the direction of travel of the belt 13 in contact therewith.

Figure 12:
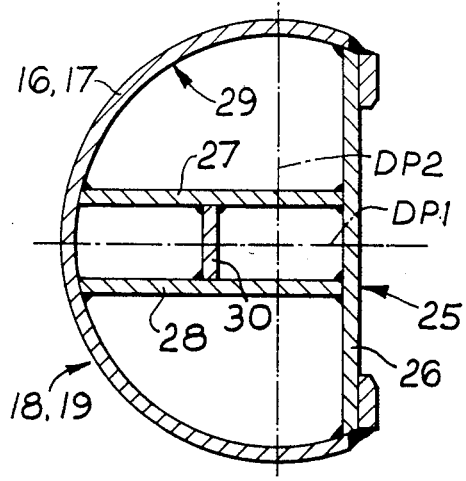
Figure 13:
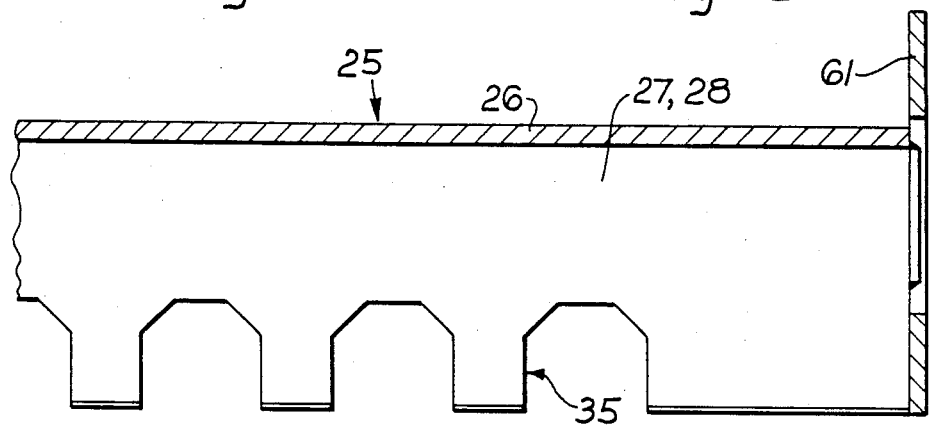
FIG. 13 is a fragmentary longitudinal section of a stiffening insert of the stationary guide member.
Figure 14:
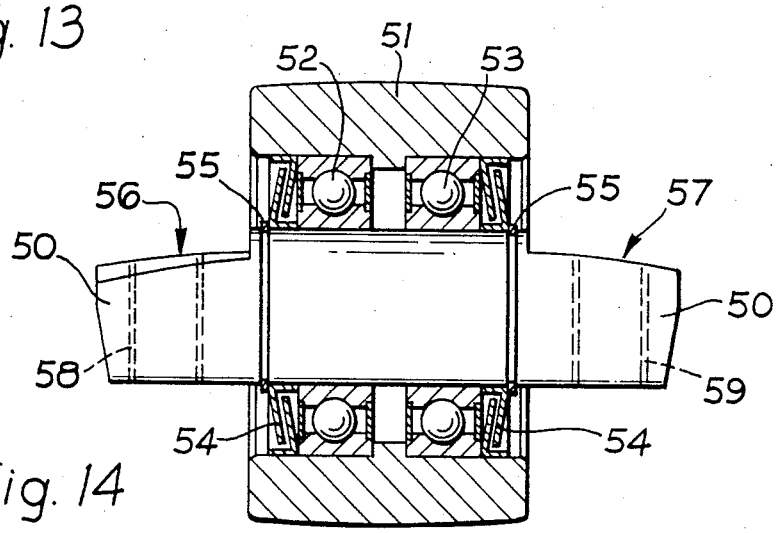
FIG. 14 is an axial sectional elevation of one of the small rollers, on a much larger scale, to be mounted in banks on the stationary guide members.

The vertical sectional shape of each of the stationary guide members 18 and 19 is apparent from FIG. 12. An insert 25 is fitted into the right-circular cylinder of which the part-cylindrical portion 16 or 17 forms part and is welded in position in the cylinder before the rear portion of same is removed. The insert 25 comprises a first rectangular plate 26, of the full length of the cylinder and the major surfaces of which are in minor chordal planes of the cylinder, second and third rectangular plates 27 and 28 also of the full length of the cylinder and which are perpendicular to the plate 26, spaced symmetrically about the diametral plane DP1 normal to that DP2 to which the plate 26 is parallel and of width to bridge between the plate 26 and the inner peripheral surface 29 of the cylinder, and a stiffening bar 30 bridging between and welded to the plates 27 and 28, the bar 30 also being parallel to the diametral plane DP2 and being positioned midway between the plate 26 and that portion of said surface 29 intercepted by the plates 27 and 28.

The openings 15 are formed in the cylinder peripheral wall and notches 35 are formed in those longitudinal edges of the plates 27 and 28 to be juxtaposed to the inner peripheral surface 29 of the cylinder, before the insert 25 is positioned within the cylinder and welded thereto. Moreover the notches 35 are formed in the plates 27 and 28 and elongate openings 36 are formed in the plate 26, before the insert 25 is assembled. The openings 36 have rounded ends and are symmetrically staggered about the longitudinal axis of the plate 26 with their longitudinal axes parallel to that of the plate 26.

Figure 5:
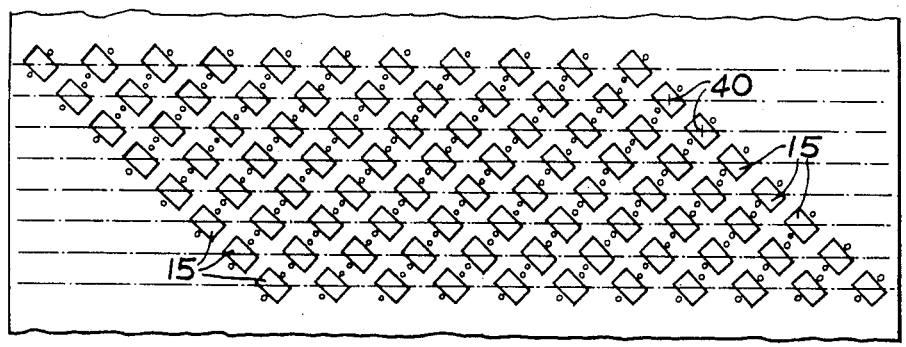
FIG. 5 is a development of the part-cylindrical portion of a stationary guide member.
Figure 6:
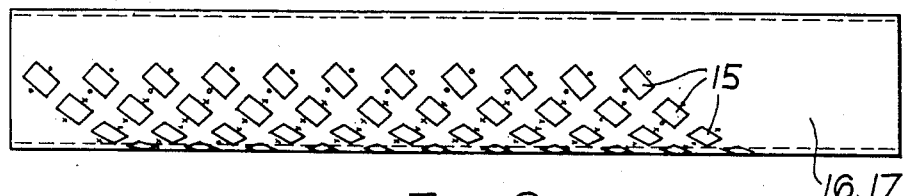
FIGS. 6 and 7 are respectively plan and elevation views of the stationary guide member the part-cylindrical portion of which is developed in FIG. 5.
Figure 7:
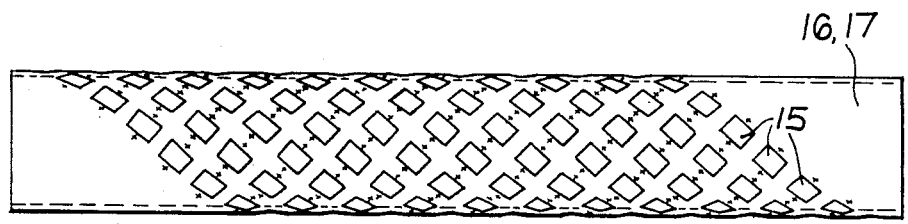
Figure 8:
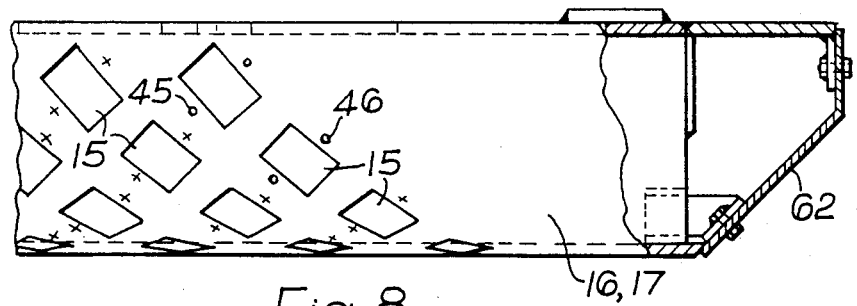
FIGS. 8 to 12 are views, on a larger scale, of the stationary guide member, namely a fragmentary plan view, a fragmentary front elevation, a fragmentary rear elevation, an end elevation and a typical vertical cross-section, respectively.
Figure 9:
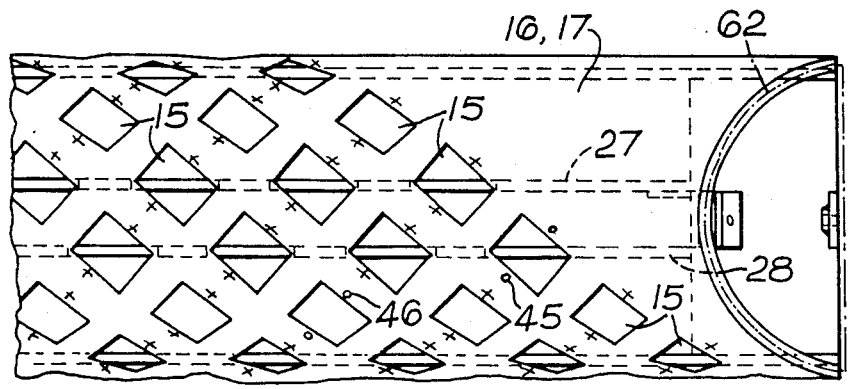
Figure 10:
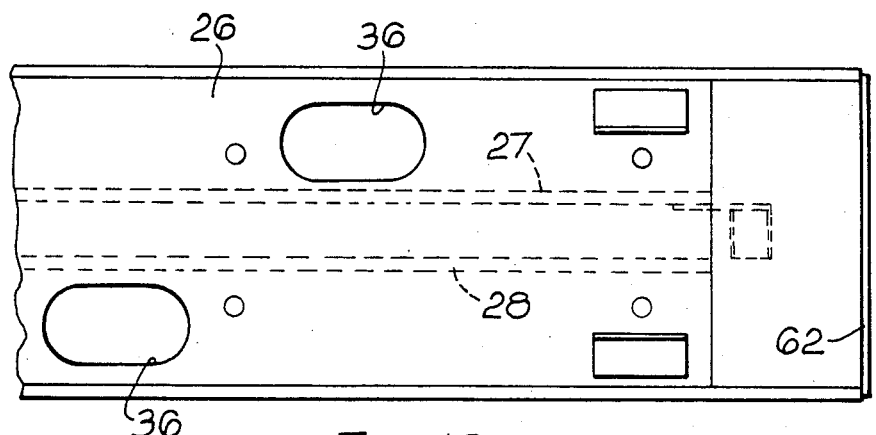
Figure 11:
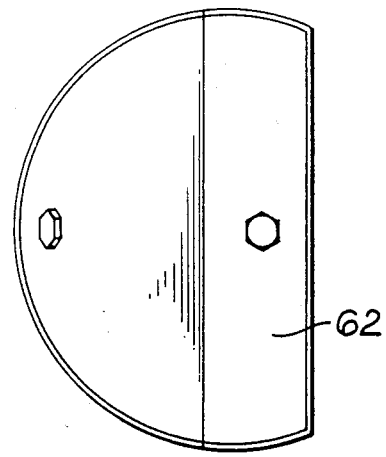

The rectangular openings 15 are located with the inter-sections 40 of the two diagonals of each interspaced both in parallel rows which extend longitudinally of the part-cylindrical portion 16 or 17 and in parallel and helical paths the means of each of which extends diagonally of the development of the part-cylindrical portion (FIG. 5). The openings 15 are arranged with their longer edges lengthwise of the diagonals representing the mean of the helix but the four rows nearest to each end are slightly out of axial symmetry with said diagonals, being slightly inclined in a direction about the intersections 40 to provide a "toe-in" attitude in relation to the line of run of an endless conveyor belt. Round holes 45 and 46 are drilled through the part-cylindrical portions 16 and 17, one at each side of each of the openings 15 with the axis of the holes in the plane passing through the respective intersection 40 and normal to the longer edges of each respective rectangular opening 15. The holes 45 and 46 at each side of each opening 15 are spot faced at their outer ends just deep enough to develop about the respective hole 45 or 46 a complete annulus having a flat bottom in a plane normal to the axis of the hole.

The notches 35 in each of the plates 27 and 28 (see FIG. 13) are positioned and dimensioned to permit clear entry thereinto of rollers 14 mounted for free rotation in the openings 15 therefor in the part-cylindrical portions 16, 17 of the guide members 18, 19. Each roller 14 (FIG. 14) comprises a spindle 50, a roller shell 51, deep groove ball bearings 52, 53 between the spindle 50 and the shell 51, sealing washers 54 at the outer faces of the ball bearings 52, 53 and external circlips 55 preventing axial displacement of the ball bearings 52, 53. The elongate openings 36 in the plates 26 are for enabling access to be had for the positioning of the rollers 14 from within the guide members 18, 19. The surface areas 56, 57 of the roller spindles 50 are shaped to bear snugly against the inner peripheral surface 29 of the part-cylindrical portion 16 or 17 of the stationary guide member 18 or 19 about the peripheries of the respective round holes 45 and 46. Tapped holes 58, 59 through the spindles 50 are then engaged from the outside by the threaded stems of screws 60 the heads of which are flush in the annuli about the round holes 45 and 46.

Temporary end discs 61 are fillet welded to each insert 25 (see FIG. 13) to provide a means of measuring accurately the effective diameter of insert 25 which otherwise could not be gauged. The end discs 61 are removed before the insert 25 is located within the respective cylinder. On sitting the insert 25 in the cylinder the notches 35 must be axially central with the intersections 40 of the two diagonals of the respective openings 15. Each insert is fully welded to the inner peripheral surface 29 of the cylinder before the minor part-cylindrical portion of the latter is removed. End covers 62 are secured to the ends of the guide members 18, 19.

Figure 4:
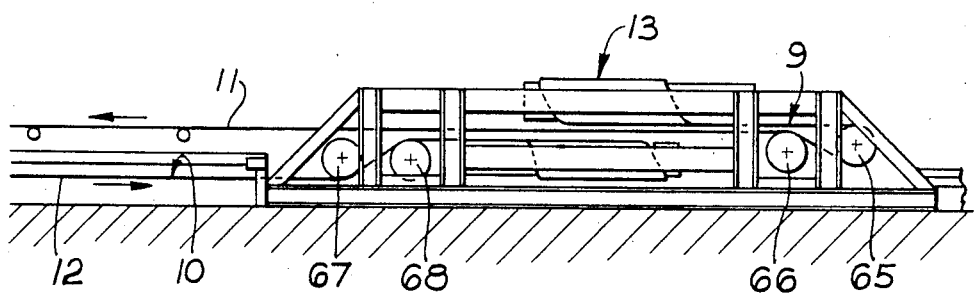
FIG. 4 is a side elevation of the angle station.

As can be seen in FIG. 4, the inner surface 9 of the upper run 11 of the endless conveyor belt 13 contacts those curved surfaces of segments of the numerous freely-rotatable small rollers 14 (hidden by the belt in FIG. 4) which are proud of the part-cylindrical portion of the upper stationary guide and the direction of travel of the upper run is changed through 90° due to the attitudes of the small rollers 14.

Prior to contacting the small rollers 14 of the upper stationary guide member 18, the inner surface 9 runs over small rollers 14 on a stationary guide transverse of the belt (FIG. 1). The guide transverse of the belt comprises a series of spaced small rollers 14 mounted in axial alignment across a plate free to swivel within limits about its vertical centre of symmetry. By adjusting the attitude of the plate horizontally (and thus the small rollers) by screw means, the belt may be steered so as to approach the upper stationary guide member 18 in a central position. On leaving the upper stationary guide member 18, the belt surfaces are reversed and the belt passes about a first guide roller 65 and then over a second guide roller 66 so that the belt surfaces are restored to their original dispositions when the belt emerges from the angle station. The inner surface 10 of the lower run 12 of the endless conveyor belt, on entering the angle station, passes below a third guide roll 67 and over a fourth guide roll 68 so that the outer surface of said lower run 12 contacts the continuously-changing segments of those curved surfaces of the numerous freely-rotatable small rollers 14 which are proud of the part-cylindrical portion of the lower stationary guide member 19 and the direction of travel of the lower run is changed through 90° and the belt surfaces are reversed on the lower run 12 of the belt leaving the lower stationary guide member 19 to be then again directly below the upper run 11.

Figure 3:
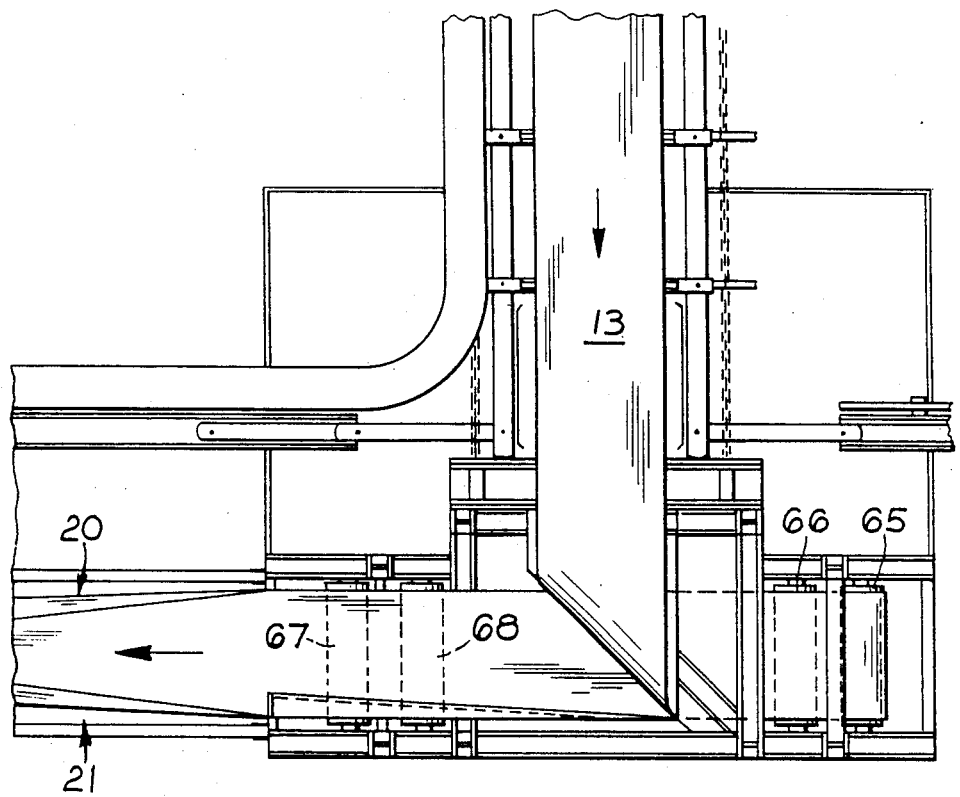
FIG. 3 is a plan view of the angle station and of the upper run of the belt both approaching and leaving same.

Material such as coal will be thrown off the incoming upper run of the belt on passage thereof about the upper stationary guide member 18 and fall on to the outgoing run of the upper run of the belt (see FIG. 3).

The angle station may be so assembled that it can be arranged on the level to accept belt entry thereinto from any given direction normal to the entry roller and direct belt exit therefrom either on the level or at a dipping or rising inclination after undergoing a change of direction through 90° either to the right or to the left.

Referring now to FIGS. 15 to 18, the two roller banks and support beams are denoted X and Y and the incoming and outgoing runs of the endless conveyor belt are denoted 70 and 71, respectively.

In FIG. 15 bank X is mounted on the first upper pair of seatings 81, 82 and bank Y is mounted on the second lower pair of seatings 83, 84. The incoming run 70 approaches from the 12 o'clock direction and the outgoing run 71 departs in the 3 o'clock direction.

Figure 16:
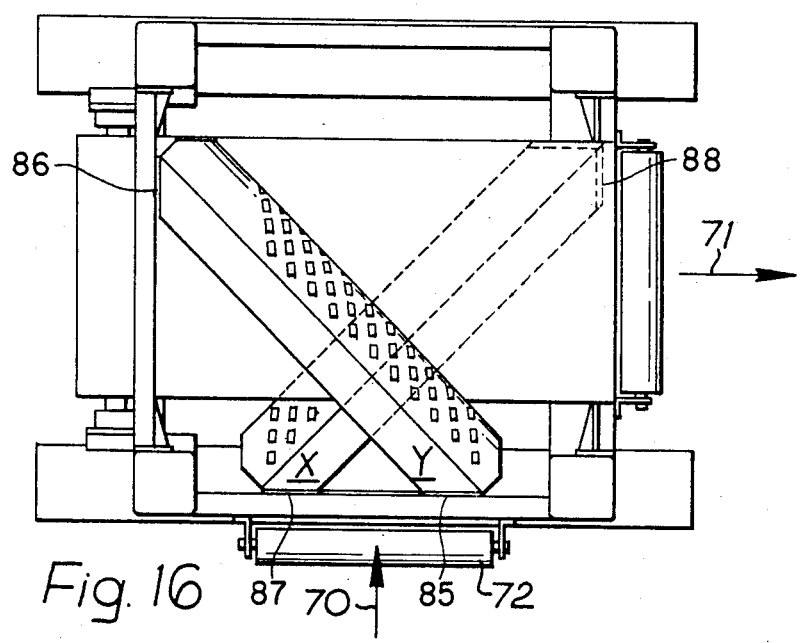

In FIG. 16 the incoming run 70 approaches from the 6 o'clock direction and the outgoing run 71 departs again in the 3 o'clock direction. To achieve this arrangement from that shown in FIG. 15, the roller banks with their support beams are transposed and each is then rotated through 180° about its axis, and the guide roller 72 and 73 associated with the incoming run 70 and its return 70A are transferred to the new intake side of the angle station. Thus bank Y is mounted on the third upper pair of seatings 85, 86 and bank X is mounted on the fourth lower pair of seatings 87, 88.

Figure 17:
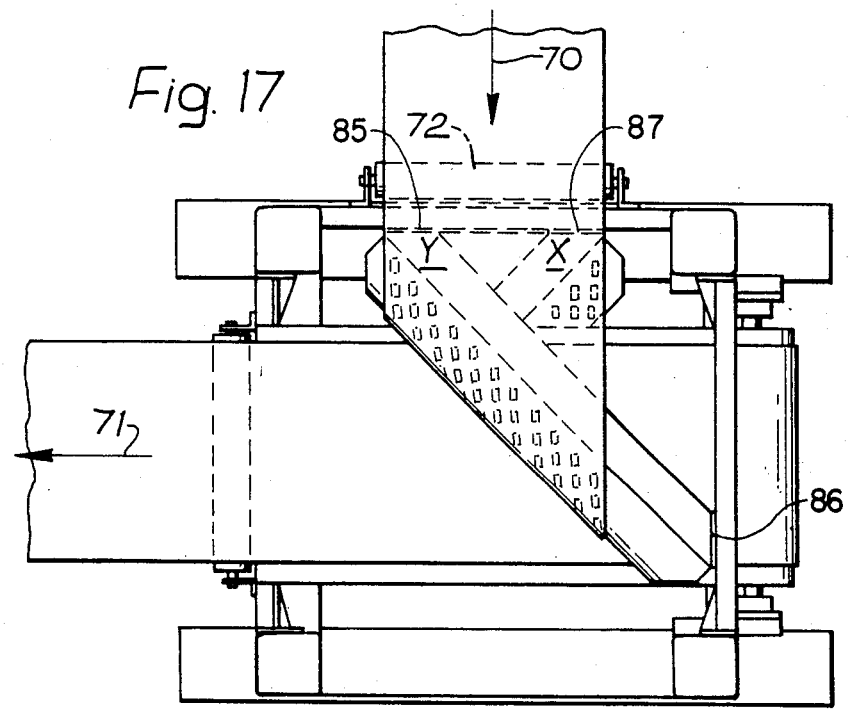

In the FIG. 17 arrangement, there is a complete reversal of the directions of the incoming and outgoing runs 70 and 71 from the FIG. 16 arrangement, the incoming run approaching from the 12 o'clock direction and the outgoing run exiting in the 9 o'clock direction, and this is achieved by rotating the entire angle station through 180° from the FIG. 16 arrangement. Thus, bank X is mounted on the third upper pair of seatings 85, 86 and bank Y is mounted on the fourth lower pair of seatings 87, 88.

Figure 18:
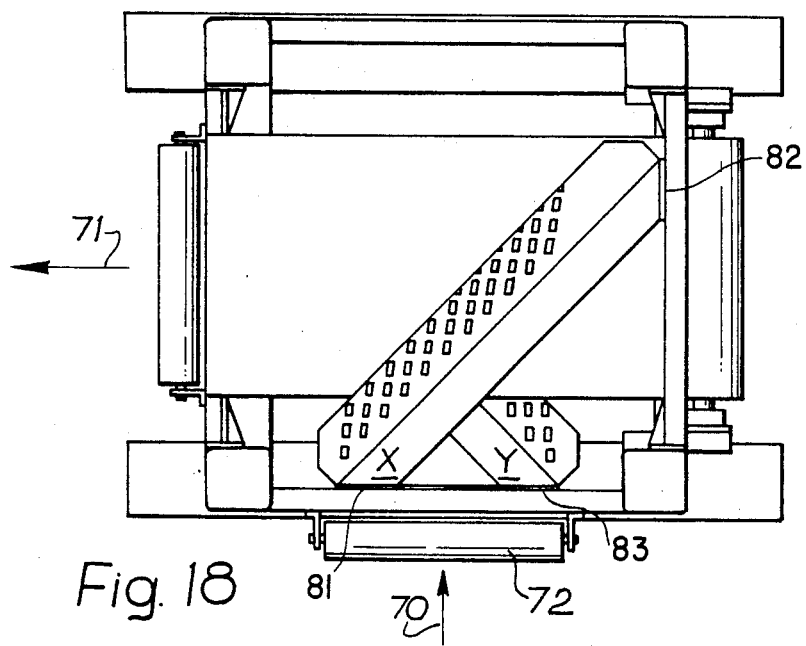

The FIG. 18 arrangement is achieved by rotating the entire angle station through 180° from the FIG. 15 arrangement to cater for the incoming run 70 approaching from the 6 o'clock direction and the outgoing run 71 exiting in the 9 o'clock direction. Thus, bank X is mounted on the first upper pair of seatings 81, 82 and bank Y is mounted on the second lower pair of seatings 87, 88.

Figure 19:
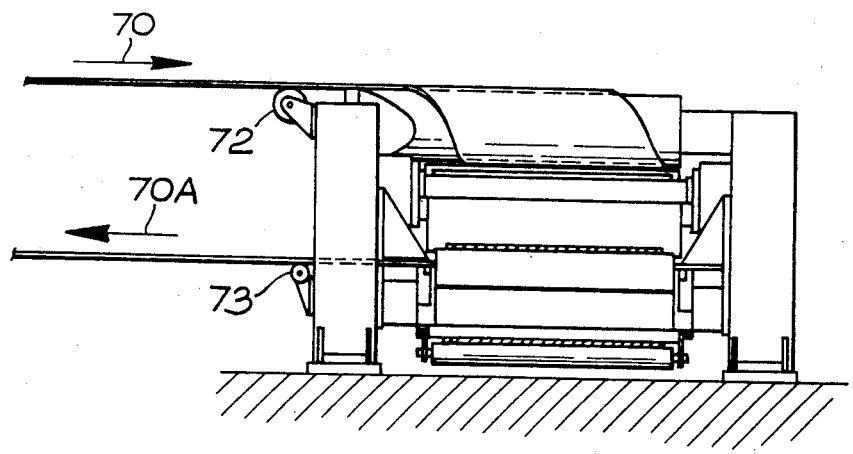

FIG. 19 shows in end elevation the guide roller 72 at intake of the incoming run 70, and the arrangement of the guide roller 72 is appropriate whether the approach of the incoming run is on the level or at a rising inclination. The arrangement of the guide roller 73 for the return run 70A is also constant.

Figure 20:
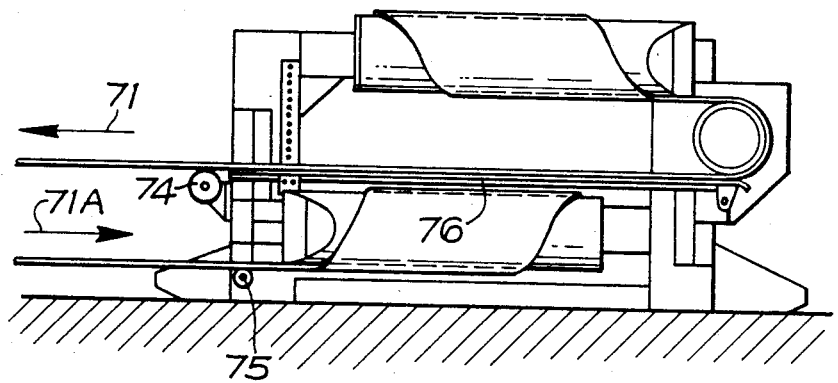
Figure 21:
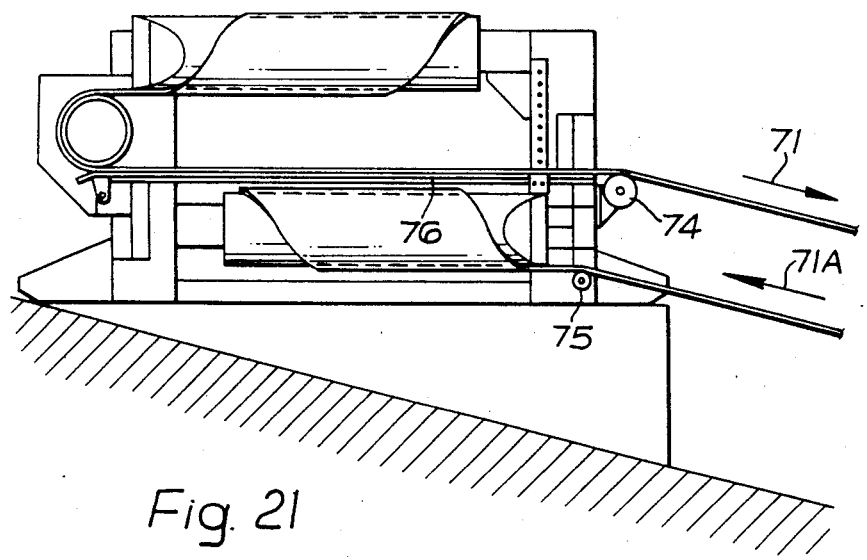
Figure 22:
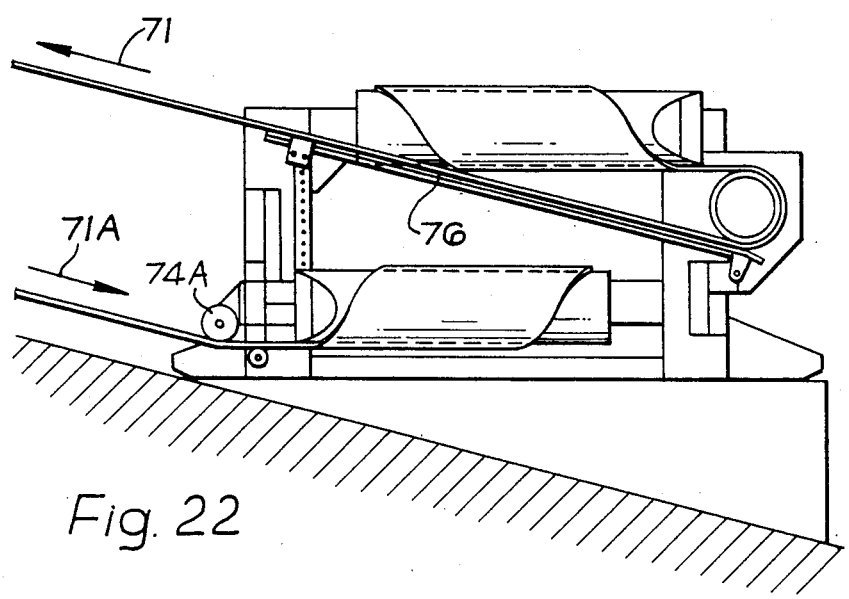

On the other hand, the arrangements of the guide rollers at exit and return of the outgoing run 71 differ according to whether the outgoing run 71 and the return run 71A are on the level or at a dipping or rising inclination. In FIG. 20 the outgoing run 71 and the return run 71A are on the level and the guide rollers 74 and 75 respectively therefor are as shown in end elevation in FIG. 20. In FIG. 21, the arrangements of the guide rollers 74 and 75 for a dipping inclination of the outgoing run 71 and a rising inclination of the return run 71A are the same as in FIG. 20, but, in the FIG. 22 arrangement, when the outgoing run 71 has a rising inclination and the return run 71A has a dipping inclination, the guide roller 74A with its mounting for the return run 71A is similar to the guide roller 74 with its mounting in the FIGS. 20 and 21 arrangements, but inverted Also shown in FIGS. 20 to 22 is an impact plate 76 disposed within the angle station below the closely outgoing run 71 to prevent undue flexure of the belt on material such as coal falling from the incoming run on to the outgoing run. The plate 76 is on the level in FIGS. 20 and 21 but is inclined upwardly with the outgoing run 71 of the belt in the FIG. 22 arrangement.

While the angle stations shown and described are intended for changes in direction of an endless conveyor belt through 90°, they could be constructed to cater for belt changes in direction through angles between 85° and 95° but this would necessitate appropriate modification of the helical paths.

I claim:

1. An angle station for an endless conveyor belt comprising:

a rectangular framework;

first and second pairs of seatings on the framework, disposed in first and second vertically spaced apart planes;

first and second elongated stationary guide members mounted to said first and second pairs of seatings, respectively, to lie across the framework in vertically spaced relationship, said first and second pairs of seatings being located such that the axes of said guide members are disposed substantially at 90° to one another;

each stationary guide member comprising:

a pair-cylindrical portion of the shape of a major segment of a right-circular cylinder mounted on a rectangular plate which is adapted for attachment to said pairs of seatings, a plurality of openings being formed in the part-cylindrical portion, said openings being substantially rectangular and located such that the intersections of the two diagonals of the openings are relatively interspaced both in parallel rows which extend longitudinally of the respective part-cylindrical portion, and in parallel and helical paths the means of each of which extend diagonally of the development of the part-cylindrical portion, and a plurality of freely rotatably rollers mounted in and projecting through said openings, such that continuously-changing segments of the curved surfaces of the freely-rotatably rollers project through said openings at an attitude to change the direction of movement of the belt through substantially 90° during passage of the belt about the part-cylindrical portion of the guide member; and a third pair of seatings provided on the same plane as the first pair and a fourth pair of seatings provided on the same plane as the second pair, each of said third and fourth pairs of seatings being adapted to receive the guide members of the second and first pairs of seatings, respectively, and to support the same with their axes substantially at 90° to one another;

whereby the direction of entry of the conveyor belt into the angle station can be altered from one side of the framework to the opposite side by removal of said first and second guide members from the first and second pairs of seatings, transposition of said guide members, rotation thereof through 180° about their axes and mounting thereof on the fourth and third paris of seatings, respectively.

2. An angle station as claimed in claim 1, wherein the rectangular openings formed in the part-cylindrical portion of the guide member are arranged with their longer edges lengthwise of the angles representing the mean of the helix, but those of at least the outermost rows thereof being slightly out of axial symmetry with said diagonals, so as to be slightly inclined in the direction about the intersections in order to provide a toe-in attitude in relation to the line of run of the belt.

3. An angle station as claimed in claim 1, wherein a round hole extends through the part-cylindrical portion, at each side of each rectangular opening, with the axes of the two holes in the plane passing through the respective intersection and normal to the longer edges of the opening, each hole having therearound at its outer end a complete annulus having a flat bottom in a plane normal to the axis of the hole.

4. An angle station as claimed in claim 3, wherein each stationary guide member comprises a first rectangular plate of the full length of the pertaining part-cylindrical portion with its major longitudinal edges welded to the longitudinal edges of the part-cylindrical portion and its major surfaces in minor chordal planes of the right-circular cylinder, second and third rectangular plates also of the full length of the part-cylindrical portion and which are perpendicular to the first rectangular plate, are spaced symmetrically about the diametral plane normal to the diametral plane to which the first rectangular plate is parallel, and bridge between and are welded to the first rectangular plate and to the part-cylindrical portion, and a stiffening bar bridging normally between and welded to the second and third rectangular plates substantially midway between the first rectangular plate and the arcuate section of the part-cylindrical portion intercepted by the second and third rectangular plates.

5. An angle station as claimed in claim 4, wherein the second and third rectangular plates have therein notches which open from the longitudinal edges thereof juxtaposed to the part cylindrical portion, each of the notches being axially central with the intersection of the two diagonals of a respective opening and being dimensioned to permit clear entry thereinto of rollers mounted for free rotation in the openings.

6. An angle station as claimed in claim 5, wherein the first rectangular plate has therethrough elongate openings which have rounded ends and are symmetrically staggered about the longitudinal axis of the plate with their longitudinal axes parallel to that of the plate, said elongate openings enabling access to be had for the positioning of the rollers from within the respective guide member.

7. An angle station as claimed in claim 6, wherein each roller comprises a roller shell mounted through ball bearings for free rotation about a spindle whereof the projecting ends have surface areas shaped to bear snugly against the inner peripheral surface of the part-cylindrical portion of the respective stationary guide member about the peripheries of the respective round holes and have therethrough tapped holes engaged from the outside by the threaded stems of screws the heads of which are flush in the annuli about the round holes.

8. An angle station as claimed in claim 7, including a stationary guide positioned to intercept the path of the lower surface of the upper run of the endless conveyor belt on to the curved surfaces of rollers mounted on the stationary guide member, said stationary guide comprising a series of spaced small rollers mounted in axial alignment across a plate disposed transversely of the upper run of the endless conveyor belt and free to swivel within limits about its vertical centre of symmetry, whereby the horizontal attitude of the plate and hence of the rollers thereon can be adjusted to steer the approach of the belt to the stationary guide member.

9. An angle station as claimed in claim 1, wherein guide roller arrangements for both the exiting run of the endless conveyor belt and the associated return run are adaptable to cater for dipping and rising inclinations of said runs on approach to and departure from the angle station.

10. An angle station as claimed in claim 1 and including therewithin closely below the exiting run of the belt an impact plate to prevent undue flexure of the belt on material such as coal falling thereonto from the incoming run of the belt.

11. An angle station as claimed in claim 10, wherein said impact plate is mounted in a manner enabling adjustment thereof to inclination of said exiting run within the angle station.

* * * * *